Aug. 24, 1937.   R. A. RODRICK   2,090,702
WINDSHIELD WIPER
Filed June 15, 1936   3 Sheets-Sheet 2
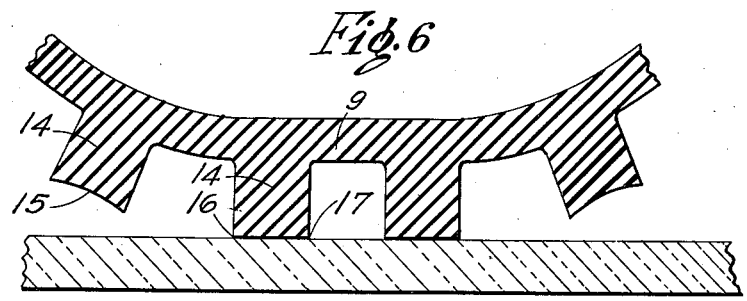
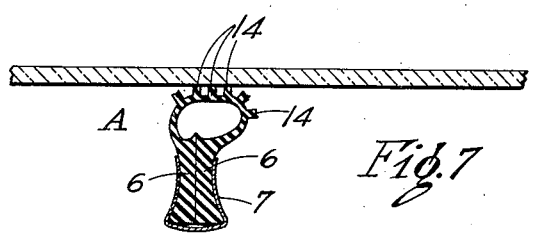
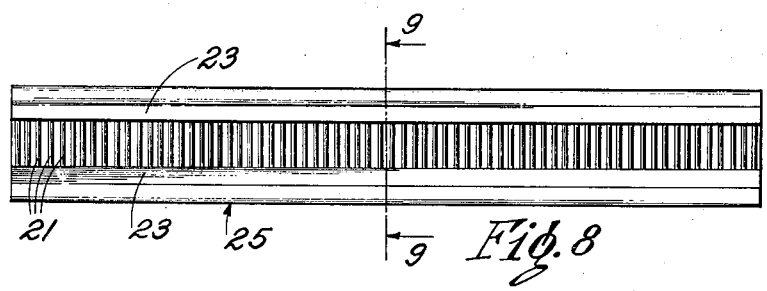
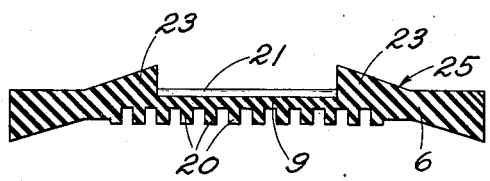
Inventor
RAYMOND A. RODRICK
Attorneys

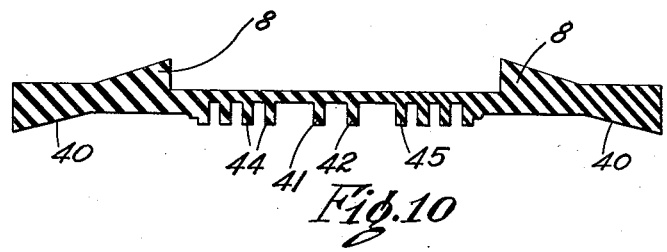
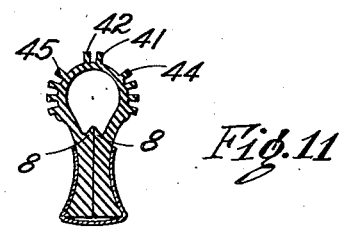
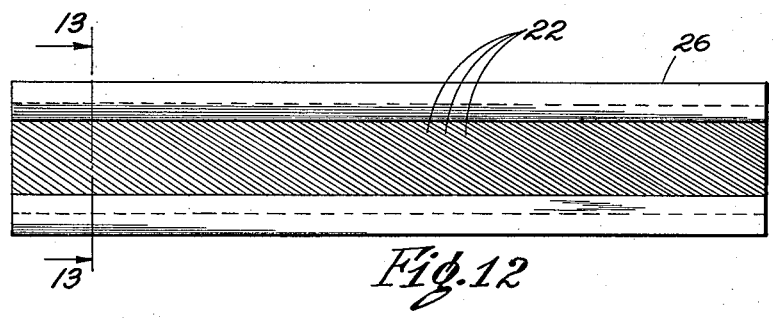
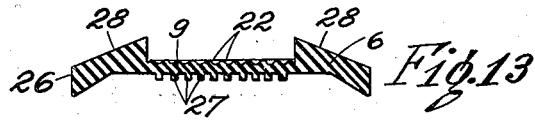
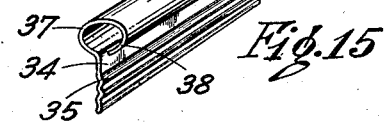
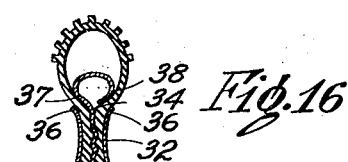
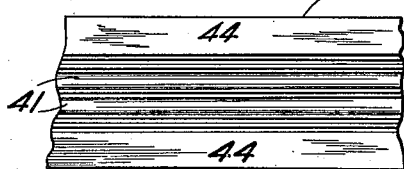
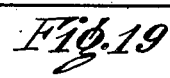

UNITED STATES PATENT OFFICE 2,090,702

WINDSHIELD WIPER

Raymond Armstead Rodrick, Akron, Ohio

Application June 15, 1936, Serial No. 85,189

12 Claims. (Cl. 15—245)

This invention relates to windshield wiper elements and more particularly to a novel type of wiper element, certain forms of which are shown in my copending application Serial No. 752,269, filed November 9, 1934, of which this application is a continuation in part.

It is desirable in a windshield wiper to provide a wiping element which will accommodate itself to irregularities or variations at the surface of the glass which is to be wiped without forcing any portion of the working surface of the wiper element away from the glass, and which will scrape or cut the film or drops of water or the like from the whole surface of the glass over which it is moved. Many wiper elements heretofore provided have been constructed to present one or more thin edge surfaces to the glass and these wiping surfaces are ordinarily inclined with respect to the glass by the wiping action of the blade. Placing the edge of a wiping blade at an inclination to the glass results in what may be described as a troweling action with respect to the water upon the glass. More specifically, the conventional type of wiper blade, inclined to the glass and swept or dragged thereacross, causes the water on the foreside of the blade to acquire a wedge shape whereby a film of this water is constantly wedged in under or is "troweled" beneath the blade and left on the glass. Ordinarily the greater the amount of water met on the foreside of such an inclined blade during the wiping action, the greater the amount which will be troweled or wedged beneath the blade as it is moved across the glass.

A further defect associated with the conventional troweling type of wiper blade is that silt particles disposed upon the windshield glass tend to be troweled beneath the blade rather than be carried along by the water on the foreside of the blade as it sweeps across the glass. This results in a cutting or scratching of the glass and a smearing of the glass by the water as the silt particles are released beneath the troweling edge of the blade.

If such a wiper is made more rigid for the purpose of reducing or eliminating the troweling action, it thereupon becomes correspondingly less able to adapt itself to imperfections or variations in the state or condition existing between the wiper and the glass surfaces. Upon encountering a bump or the like in the surface the relatively rigid wiper blade will tend to be raised throughout at least a portion of its length remote from the bump and thereby permit a large quantity of water to remain untouched beneath the blade. Conversely when a rigid blade passes over a depression in the glass surface it will fail to remove the water therefrom. The above action results in a blurred and poorly wiped windshield glass. On the other hand if the wiper blade presenting an inclined or troweling face to a windshield glass is made sufficiently flexible to accommodate bumps or imperfections in or on the glass, it will respond readily to the pressure of the wedge shaped volume of water on the foreside of the blade and the action of the water itself will move the blade away from the glass and permit the water to flow and remain beneath the blade during its movement.

Numerous attempts have been made in the windshield wiper art to overcome the defects above pointed out. It has been proposed to shape a wiper blade so that a plurality of parallel inclined surfaces will be presented to the glass so that a part of the water which may be troweled past the leading inclined surface will be caught by the following inclined surfaces. Where such parallel inclined surfaces are more or less a unitary part of a rigid blade, however, it will be apparent that the blade as a unit will be raised upon encountering a bump or imperfection in or on the surface of the glass and thus will permit water to escape beneath the blade and be streaked on the glass.

It is among the objects of my invention to provide a wiper blade which will flex to accommodate bumps or imperfections, in or on the surface of the windshield or variations in conditions between the blade and the glass, and which will at the same time present an effective scraping or wiping surface to the glass. It is a further object of my invention to provide a wiper having one or more elements arranged to be presented to the surface to be wiped in a manner for efficient wiping thereof, and also having a supporting portion or element arranged to permit all necessary flexing of the wiping element while maintaining it in efficient wiping position. A further object of my invention is to provide a wiping blade wherein the wiping element in contact with the glass is pulled over the surface of the windshield glass rather than pushed, thereby eliminating any tendency of the blade to chatter while in operation. Another object is to provide a wiper in which a plurality of wiping elements may either individually or simultaneously be moved in an efficient wiping position with respect to the surface to be wiped, while being held with relative freedom with respect to longitudinal flexings of the elements whereby each element is permitted to adapt itself to irregularities or obstacles in or on the surface to be wiped. It is a further object of my invention to provide a wiper element having a rib thereon in contact with the glass having a flat surface substantially parallel to the glass and a flat surface extending substantially normal to the glass. It is a further object of my invention to provide a wiper element which is adapted for successful use with various types of wiper arms and wiper clips and which will operate satisfactorily whether the clip or arm is designed to permit "flopping" or rocking or not. It is a further object of my invention to provide a wiper blade which is proportioned and constructed so that irregularities in the wiper blade will be accommodated by a flexing of the blade in the direction of its length. It is a further object of my invention to provide a wiper blade having a generally tubular form which will be free of excessive internal stresses occasioned by the shaping of the blade. It is a further object of my invention to provide a wiper blade having a normally concave glass contacting face which is adapted to be reformed when operatively positioned against the glass to shape a face of the blade into parallelism with the glass.

Another object is to provide a windshield wiper capable of carrying out and achieving the foregoing objects and advantages which lends itself to economical manufacture as well as long and efficient service.

Other objects and advantages relating to simplicity of construction and economy of manufacture will appear from the following description and the appended drawings wherein:

Figure 6 is an enlarged sectional view with parts broken away to illustrate the relation between the wiper and windshield glass when applied thereto;

Figure 7 is a view similar to Figure 3, but illustrating the flexing of the blade during operation;

Figure 8 is a plan view of the back face of the strip employed in a modified form of my invention;

Figure 9 is an enlarged sectional view taken along the line 9—9 of the modification of Figure 8;

Figure 10 is a sectional view of the strip employed in a further modification;

Figure 11 is a sectional view of the wiper element resulting from the arrangement of the strip of Figure 10 in tubular form;

Figure 12 is a plan view of the back of a strip of a still further modification;

Figure 13 is a sectional view taken along the line 13—13 of Figure 12;

Figure 14 is a perspective view with parts broken away of a strip employed in a further modification of my invention;

Figure 15 is a perspective view of a filler employed in connection with the strip of Figure 14;

Figure 16 is a sectional view illustrating the strip of Figure 14 and the filler of Figure 15 as assembled in a wiper element ready for use;

Figure 17 is a cross sectional view of a modified form of wiper blade strip;

Figure 18 is an end view of the strip shown in Figure 17 arranged in a tubular form and restrained within a holding channel;

Figure 19 is a plan view with parts broken away of the back side of the strip shown in Figure 17.

Figure 2:
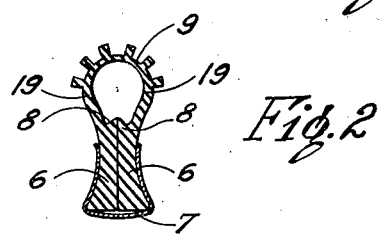
Figure 2 is a transverse sectional view taken along the line 2—2 of Figure 1 and showing certain portions of the wiper element exaggerated in proportion.
Figure 3:
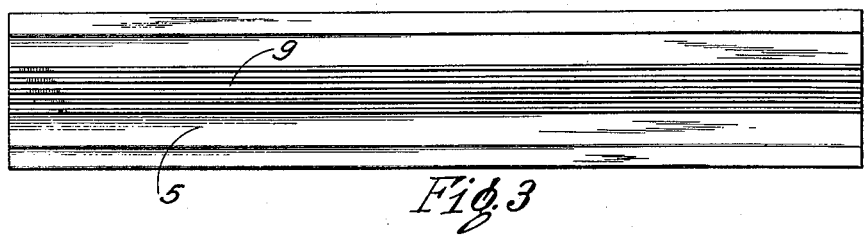
Figure 3 is a plan view of the front face of the strip of rubber or like material employed to form the tubular wiper shown in Figure 1.
Figure 4:
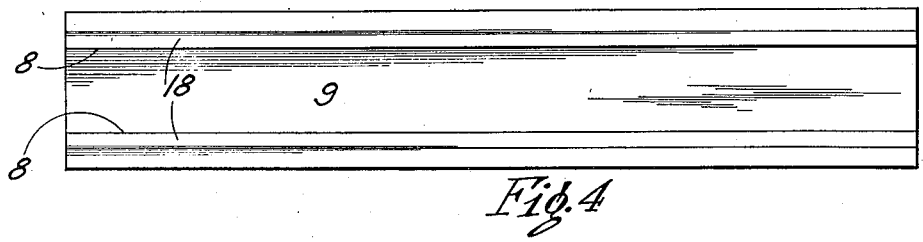
Figure 4 is a plan view of the back of the strip shown in Figure 3.
Figure 5:
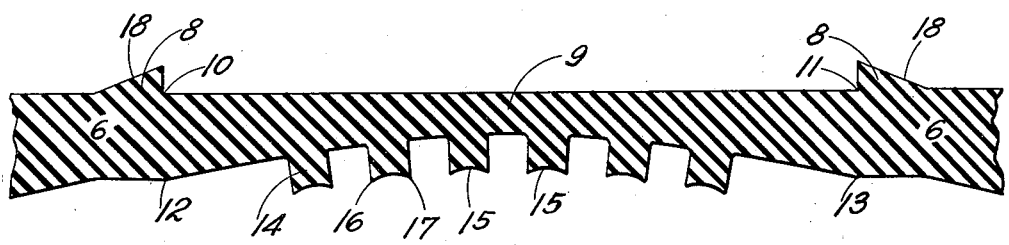
Figure 5 is an enlarged transverse sectional view of the strip while flat as shown in Figures 3 and 4.

Generally speaking, I have attained the advantages outlined in the foregoing objects by making a wiper blade from a longitudinal strip of rubber which has one face thereof provided with longitudinal glass contacting ribs. The longitudinal edges of the strip are brought together and restrained within a U-shaped channel or the like so as to provide a rounded glass contacting tubular section. Preferably the strip identified generally as at 5, see Figs. 3, 4 and 5, is formed to provide thickened longitudinal edge portions and a relative thinner central section. The thickened edge portions indicated at 6 are gripped within the U-shaped channel 7, see Figure 2. The inner face of the strip slightly inwardly from each marginal edge thereof is preferably provided with longitudinal wedge shaped ribs 8 which, when the strip is formed to provide a tube, will hold the thin central portion of the strip 9 outwardly and give it a proper rounded contour. As will be understood as the description proceeds, means other than the internal triangular ribs 8 may be provided to force the thin section of the strip outwardly and give it the desired rounded contour. The metallic channel member 7 is preferably "bell mouthed" during the clamping of the same upon the marginal edges of the strip, and the compression of the rubber within the channel co-operates with the bell mouth to maintain the desired rounded contour and effectively prevent a wearing away or "rim cutting" of the strip due to the flexing of the tube during operation.

In the preferred embodiment of my invention as illustrated on an exaggerated scale in Figure 5 the central portion 9 of the strip is thicker at its juncture with the edge portions of the strip than at the center thereof. Among the advantages which flow from the cross sectional contour there shown, is that the center is given the desired softness or flexibility and yet the edges thereof will be securely anchored to the attaching marginal edge portions. The thickening of the central portion 9 as it merges with the marginal edges may be relatively slight in actual practice and I have found that desirable operative characteristics may be obtained by proportioning the center part to have a thickness of about from .010 to .012 inch less than the thickness at the juncture between the central portion and the attaching marginal portions 6.

A further advantage growing out of the thickness variation in the strip is one associated with the long life and wear resistance of the wiper. It will be observed by reference to Figure 5 that the over-all distance from 10 to 11 on the inside face of the strip is less than the over-all distance from the point 12 to the point 13 (exclusive of ribs) on the outside of the strip. By proportioning the strip to have a greater over-all width on that face which becomes the outside it will be understood that a substantial portion of the tensioning effect due to giving the strip a tubular shape is obviated. In this manner the rubber at the outer side of the tubular structure is relatively slack after bending the strip to tubular form and the leading wall of the tube under wiping load is therefore less subject to tearing or other deleterious effects arising from excessive internal stresses in operation.

In the molding of the strip the dies to form the same are preferably shaped to give the ribs 14 a concave or "hollow ground" contour as at 15 throughout the glass contacting areas thereof. The ribs 14 may retain this concave face 15 until the blade is applied to the windshield and when positioned thereon the normal pressure of the windshield wiper arm, as found within the range of present conventional practice, serves to reform the rib section to press the face of the rib substantially flat against the surface of the glass about as illustrated in Figure 6. As thus positioned against the windshield glass, it will be seen that each rib 14 possesses a scraping or wiping edge as at 16 and 17. Where the ribs 14 are joined to the body of the strip 9 a rounded corner or filet is preferably provided to strengthen the juncture between the ribs and the body and to reduce the tendency of the rib 14 to bend at an angle with respect to the body of the wiper.

Preferably the wiper constructed according to my invention is proportioned with respect to the thickness of the central section 9 and the material thereof to place two of the ribs on the outer face of the blade in contact with the glass at the same time. When the wiper blade is in operation, however, one, two, three or more of the ribs may be brought into a wiping relation with the glass depending upon the pressure of the wiping arm, the flexibility of the tubular section and the thickness of the spacing between the ribs. In any event the ribs are proportioned in thickness with respect to the flexibility of the tubular section so that the ribs brought into contact with the glass will always remain substantially normal to the glass and thus I have provided a wiping element substantially free of any troweling action such as would result from a tilted or inclined rib operatively contacting the glass. It will be understood that where a plurality of ribs are in contact with the glass to be wiped, that I desire and have provided a structure in which at least one rib will be in the preferred position, i. e., substantially normal to the glass, and that even if other ribs are in less desirable positions the ultimate desirable wiping relationship will be maintained and accomplished by at least the one or more most effectively placed ribs.

By way of illustration of the proportions and pressures which I have found desirable and advantageous in my wiper blade construction I have found that where the wiper arm exerts about one pound pressure on a wiper blade of about eight inches in length, that the thinnest portion of the blade, as shown for example in the middle at Figure 5, may preferably be about $\frac{1}{32}$ of an inch thick when the strip is about 1¼ inches wide and is made of rubber cured to a condition of toughness consistent with ready flexibility and in which the outstanding ribs are about $\frac{1}{32}$ of an inch thick, spaced about $\frac{1}{32}$ of an inch from the center and stand about $\frac{3}{64}$ of an inch in height. It will be understood of course that reasonable departures may be made from the dimensions and pressure above given, and that the dimensions and pressure are stated only by way of illustrating an operative and desirable embodiment of my invention, and that a blade proportioned as above will operate satisfactorily throughout a wide range of wiper arm pressures.

It will be understood that the life of the wiper blade constructed according to my invention will be lengthened and the operation throughout the life of the blade will be rendered more satisfactory if the rubber is compounded in a manner to render the completed article resistant to wear, heat, cold and moisture. Suitable rubber compositions which include ingredients rendering the article resistant to heat, cold and moisture and which will prevent checking of the product when subjected to the sun will occur to those skilled in this art. The term rubber as employed in this application is intended to include artificial rubber or synthetic rubber or other like resilient materials which possess the physical properties and other characteristics which adapt it for use in my invention.

To render the wiper blade flexible; that is soft so that it will flex as shown in Figure 7 and still maintain the flat edged ribs normal or substantially normal to the glass, the tubular wall should be relatively thin, and means are provided to prevent collapse of the tube and maintain it in open hollow form during wiping action. Preferably I maintain the thin walls in their rounded condition as shown by integrally forming on the back face of the edge portions 6, the triangular ribs or raised portions 8. As shown in Figure 2 when the marginal edges of the strip are brought together and clamped in the U-shaped channel, see Figure 2, the faces 18 of the ribs 8 abut each other and direct the central portions 19 outwardly therefrom at an angle determined by the inclination of face 18. The portions 19 may be joined to the marginal attaching portions 6 at an angle other than as shown, but in all events it is desirable that the ribs 8 and the manner in which the portions 6 are secured to the portions 19 be such that the glass contacting portion of the blade be given a rounded or tubular configuration and restrained from collapsing during operation. The presence of any means functioning as the ribs 8 or other equivalent tubular form maintaining means, maintains the longitudinal flexibility of the wiping ribs 14 by virtue of the open "arch effect" of the hollow tubular construction under wiping load.

Figure 1:
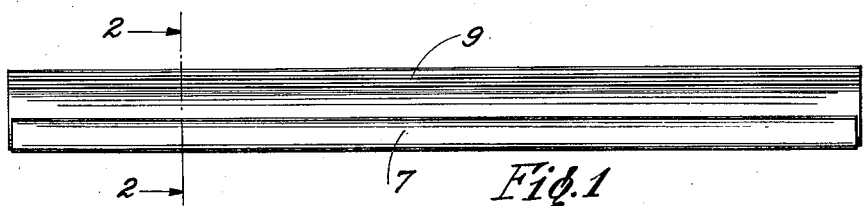
Figure 1 is an elevation of a wiper element constructed according to my invention.

In Figures 8 and 9 I have shown a modification of a wiper element 25 made according to my invention wherein the inner face of the strip is provided with a plurality of transverse ribs 21 which serve to re-enforce and strengthen the curved face of the tubular blade. It will be understood that each of the transverse ribs 21 functions to arrest any tendency of the thin curved face section to tear along the line of one of the longitudinal ribs 20. Among the advantages flowing from the construction shown in Figs. 8 and 9 are these: that one may use in the central portion 9 of the wiper strip substantially the same amount of material, but by apportioning that material between the transverse ribs and the flat or tubular portion (the structure and material of the wiping ribs being considered to be the same for the sake of comparison) a greater transverse strength and solidity of the wiper element can be obtained, while at the same time a greater longitudinal flexibility may be obtained whereby the wiper can more readily adapt itself to the surface over which it is passed in operation. I believe that this advantageous result comes about because the several transverse ribs act conjointly in maintaining the tubular form of the blade during operation, thereby restraining transverse flexing and reducing the fatigue of the material, but that the several ribs act relatively independently as against longitudinal flexing of the wiping ribs 20, as shown in Figure 9, whereby the wiping ribs 20 may flex longitudinally more readily and more advantageously for a given quantity of material in the blade. Each of the transverse ribs 21 appears to function as an arch with its abutments at the juncture between the central section 9 and the attaching marginal portion 6. The outer or glass contacting face of the wiper of Figures 8 and 9 may be provided with spaced ribs 20, concaved on their outer faces in accordance with the preferred embodiment, or may be provided with flat outer faces as shown. The marginal attaching portion of the strip may also have the triangular ribs 23 which function like the ribs 8 in the preferred embodiment. It will be understood that this strip having the transverse ribs 21 may be assembled within a U-shaped channel or equivalent holder in a manner illustrated and described in connection with Figures 1 and 2, and used in a similar way.

To accommodate large quantities of water which may be accumulated on the foreside of the blade as it sweeps across the glass I have provided a wiper element 40 such as shown in Figures 10 and 11, wherein the most forward portion of the blade or that which is normally in contact with the glass is provided with a pair of ribs 41 and 42 and the tubular element is free of ribs immediately adjacent said pair. In other respects the species shown in Figures 10 and 11 corresponds to my preferred embodiment. The space between the rib 41 and the rib 44 on one side and between the rib 42 and the rib 45 on the other side provides a longitudinally extending conduit or channel. As the blade swings back and forth in an arc the water accumulated in each of the channels formed by the ribs will be more readily conducted longitudinally to the end of the blade through said channels.

A tubular blade according to my invention may advantageously be made by forming ribs on the rear face thereof as illustrated by the species identified at 26 and shown in Figures 12 and 13. The ribs 22 are arranged at an angle with respect to the marginal edge of the strip and I have found that this angular arrangement of the ribs permits the use of a heavier central section for the same or greater longitudinal flexibility of the wiper. Referring again to the arch construction employed in connection with the description of the species of Figures 8 and 9 it will be observed that each of the ribs 22 forms an arch having an over-all length which greatly exceeds the length of the arches formed by the ribs 21. The diagonal ribs 22, having a greater unsupported length than the right angularly disposed ribs 21 will flex more under the same load. Thus to maintain a tubular section having characteristics of flexibility corresponding to one with short right angular transverse ribs, or no ribs at all, see Figure 4, the central section may be increased in thickness by the use of diagonal ribs. The increase in mass or over-all thickness greatly increases the length of life of the blade. The resistance of the blade to tearing is accomplished by the heavier section and by reason of the fact that any tear started longitudinally of the blade will be arrested by the diagonal ribs 22. The advantages of the diagonal rib reinforcement (see Figure 12) may also be stated from the point of view of comparing wiper strips having the same mass in the central section 9; the strips with the diagonal ribs will have greater flexibility per unit of mass than those having the right angularly disposed ribs or those having no ribs at all. It will also be understood that where similar characteristics of flexibility are sought in the diagonal rib construction to those obtainable in the preceding forms of the construction, the additional mass of material facilitated by the use of diagonal ribs lends itself to a longer life of the wiper blade, at least through better resistance to exposure to heat and cold and changing weather conditions and other adverse circumstances under which the wiper is called upon to operate and endure.

The strip 26 may be provided with wiping ribs 27 on the forward face thereof constructed and functioning in a manner heretofore described in connection with the description of the other embodiments. The abutting faces 28 of the marginal attaching portion 6 are inclined with respect to the generally flat body of the strip and the inclination thus provided directs the central portion 9 of the strip outwardly to maintain the rounded tubular contour when the strip is folded and held in a retaining channel. It will be understood that the shaping of the marginal attaching strip as shown in Figure 13 thus accomplishes a function corresponding to the function of the longitudinal ribs 8 of the embodiments shown in Figures 1 to 11. From an understanding of the functions referred to it will also be understood that the marginal attaching portions in the embodiment of Figures 1 to 11 may be shaped as shown in the embodiment of Figure 13 without substantially altering the operation of the device.

In Figures 14 to 16 inclusive I have illustrated a type of wiper element in which a separate means is employed on the interior of the structure to give the desired or necessary tubular contour during operation. In this form of my invention the integral triangular ribs such as 8 of the preferred embodiment may be dispensed with and a flat strip 30 having wiping ribs 31 formed on the outer face thereof is positioned within a U-shaped channel 32 and a filler member 34 gripped between the marginal edges of the strip. The filler member 34 may be formed of sheet metal or the like and may be provided with ridges such as at 35 to improve the interlock between the U-shaped channel, the marginal edges of the strip and the filler means. In this form of my invention I prefer to form the U-shaped channel with a considerable "bell mouth" as at 36 and the rounded portions 37 and 38 of the filler co-operate therewith to force the walls of the tubular wiper element outwardly and maintain the desired rounded hollow contour during operation. If desired the back of the strip 30 may be re-enforced by transverse ribs such as shown in Figures 8 and 12 respectively, or the back of the strip may have a smooth planar surface as in the preferred embodiment. It will be understood that the thickness of the central portion may advantageously be varied as shown in Figure 5.

In Figures 17 to 19 inclusive I have shown a form of my invention in which that face of the longitudinal strip 40 which ultimately becomes the interior of the tubular structure is provided with longitudinally extending rounded ribs 41. Preferably the longitudinally extending ribs are proportioned with respect to the wiping ribs 42 on the forward or outer face thereof so that the ribs 41 terminate centrally of the longitudinal wiping ribs 42. In this manner the longitudinal fold or bend lines between adjacent parts of the strip are definitely positioned at that portion of the wall of the strip having the greatest thickness, namely that portion where a rib is provided on the outer face of the blade. This relieves the walls of the wiper intermediate the fold lines indicated at 43 of any substantial stresses due to the shaping of the strip into its tubular form and insures that no tearing or checking of the blade will occur at the juncture between a rib and the wall of the wiper blade. The marginal edge portions of the strip 40 are preferably thickened and provided with the angular rib 44 in the manner and for the purpose heretofore described in connection with the description of the preferred embodiment. As will be observed from Figure 18 the formation of the ribs as 41 provides a relatively thick wear resisting section between each of the ribs and positions the line of bending or fold in a part of the blade where it has considerable cross section and may thus resist longitudinal tearing. During the operation of this form of my invention the body of the blade flexes transversely and longitudinally substantially as in the forms previously described and the species of Figures 17 to 19 inclusive illustrates a method whereby a blade formed of a relatively heavy wear resistant section may be rendered flexible throughout.

As illustrated in Figures 2, 7, 11 and 16 it will be seen that I prefer to provide a greater number of longitudinally extending exteriorly disposed wiping ribs than I have illustrated as actually contacting with the glass to be wiped. In practice, however, I have found that the existing facilities for connecting the wiper arms to the wipers are such that in many instances a bodily "flopping" or rocking is permitted whereby the body of the wiper or that portion contained within the channel 7 or its equivalent is permitted or encouraged to depart from a plane normal to the surface to be wiped. I contemplate that when my wiper blade is used with such connections or when, due to wear or otherwise, the connection between the wiper blade and the wiper arm permits the rocking or "flopping" to which I have referred, then the additional longitudinal wiping ribs will be available to be brought into play to carry out the wiping action as hereinabove described. It will be seen therefore that among other advantages incident to my invention is the one of the facility with which my wiper may be used with either relatively rigid or relatively loose connections to various and sundry wiper arms.

Although I have illustrated and described the various embodiments of my invention in a hollow tubular structure, I contemplate that the invention may be carried out with other forms of wiper elements which will present an equivalent wiping face to the glass and which will flex to accommodate variations at the surface of the glass to be wiped and which will otherwise function to bring the active wiping part into an effective wiping position in substantially the same way as in the tubular forms illustrated and described.

While I have shown and described a preferred form of my invention along with a limited number of advantageous modifications thereof, it will be appreciated that other modifications and changes therein will occur to those skilled in the art without departing from the spirit or principle of my invention, and I do not desire to be limited to the form or details of the embodiments of my invention herein disclosed or in any manner, other than by the claims appended hereto.

I claim:
1. A tubular windshield wiper having longitudinal substantially square headed wiping ribs on the exterior thereof, and having transversely extending supporting ribs on the interior thereof.

2. A member adapted to form a tubular wiping element which comprises a longitudinal relatively flat strip having the central portion of one side thereof shaped to provide longitudinally extending wiping ribs, the marginal portions of said strip being thickened relative to said central portion to provide an attaching portion and to give said central portion a tubular contour when said marginal portions are brought together.

3. A strip for windshield wiper elements comprising a longitudinal, generally flat, strip of rubber having thick marginal attaching portions and a central wiping portion, the thickness of the marginal attaching portions exceeding the thickness of the central wiping portion, one side of said wiping portion being shaped to provide a plurality of wiping ribs extending longitudinally of the strip, each of the attaching portions being provided with a longitudinally extending depression spaced from the marginal edge thereof and spaced from the central portion of the strip to provide a thickened strip portion at each extreme margin of the strip and a thickened strip portion adjacent the juncture between the central wiping portion and each of the marginal attaching portions whereby when the marginal edges of the strip are brought together the wiping portion of the strip is forced to acquire a tubular shape.

4. A strip for windshield wiper elements comprising a longitudinal, generally flat, strip of rubber having marginal attaching portions and a central wiping portion, one side of said wiping portion having a plurality of wiping ribs extending longitudinally of the strip, the face of the strip opposite said ribbed wiping portion having a plurality of ribs extending transversely with respect to said longitudinal ribs.

5. A strip for windshield wiper elements comprising a longitudinal, generally flat, strip of rubber having thick marginal attaching portions and a central wiping portion, the thickness of the marginal attaching portion exceeding the thickness of the central wiping portion, one side of said wiping portion shaped to provide a plurality of wiping ribs extending longitudinally of the strip, the face of the strip opposite said ribbed wiping portion shaped to provide a plurality of ribs extending transversely with respect to said longitudinal ribs, said transversely extending ribs being at substantially right angles to the direction of the longitudinally extending ribs.

6. A windshield wiper comprising a blade holding member, a wiper element secured to said member comprising a generally flat strip of rubber having its marginal edge portions brought together and fixed thereat to said member to provide a tubular wiping portion, means within said wiper element adjacent said marginal edges to maintain the walls of said wiper element spaced from each other and give said element a rounded tubular shape, said means comprising triangular ribs integrally formed on the inner abutting walls of said marginal edge portions.

7. A windshield wiper comprising a blade holding channel U-shaped in cross section, a wiper element arranged within said channel comprising a generally flat strip of rubber having its marginal edge portions brought together and held in said channel to provide a tubular wiping portion extending beyond the edges of said channel, means within said wiper element adjacent said marginal edges to maintain the walls of said wiper element spaced from each other and give said element a rounded tubular shape, said means comprising a strip having a longitudinal attaching portion disposed between said marginal edge portions in said channel and a rounded head portion extending to engage the inner walls of said tubular wiper element.

8. A wiper element having a resilient rubber rib, said rib having opposed side walls and a concave wiping face throughout the full axial extent of the rib between said walls, said face adapted to be pressed against the surface to be wiped and reformed by the pressure of application to present a substantially flat face to said surface.

9. A strip for windshield wiper elements comprising a longitudinal, generally flat, strip of rubber having marginal attaching portions and a central wiping portion, one side of said wiping portion having a plurality of wiping ribs extending longitudinally of the strip, the face of the strip opposite said ribbed wiping portion being flat and the marginal attaching portions of said strip being thicker than said central portion.

10. A windshield wiper comprising a blade holding member, a wiper element secured to said member comprising a generally flat strip of rubber having its marginal edge portions brought together and fixed thereat to said member to provide a tubular wiping portion, means within said wiper element adjacent said marginal edges to maintain the walls of said wiper element spaced from each other and give said element a rounded tubular shape, the interior of said tubular structure intermediate said marginal edge portions being smooth, said means comprising generally triangular ribs integrally formed on the inner abutting walls of said marginal edge portions.

11. A strip for a tubular wiper element comprising a generally flat longitudinal rubber strip having a central ribbed wiping portion and marginal attaching portions, said ribbed portion being provided with a concave face to provide a distance transversely along the surface thereof exceeding the distance transversely along the surface of the face on the opposite side of the strip whereby when the edges of said strip are brought together the outer periphery of the resultant tubular section is provided with sufficient material to compensate for the difference in periphery between the inner and outer walls.

12. A windshield wiper comprising a blade holding channel U-shaped in cross section, a wiper element arranged within said channel comprising a generally flat strip of rubber having its marginal edge portions brought together and held in said channel to provide a tubular wiping portion extending beyond the edges of said channel, the outer face of said tubular wiping portion remote from said channel provided with a plurality of longitudinally extending wiping ribs adapted to contact the windshield glass, each of said wiping ribs having a substantially rectangular cross section and presenting a substantially flat wiping face to the windshield glass, means arranged within said wiper element at the juncture between the tubular wiping portion and the marginal edge portions within the channel to maintain the walls of said wiper element in spaced relation from each other at said juncture and give said element a rounded tubular shape.

RAYMOND ARMSTEAD RODRICK.